Oct. 15, 1968  K. W. HANSEN  3,405,733

FLUID DISTRIBUTOR VALVE

Filed June 17, 1966  3 Sheets-Sheet 1

Kay W. Hansen
INVENTOR

BY Oliver D. Olson

Agent

Kay W. Hansen
INVENTOR

BY Oliver D. Olson

Agent

3,405,733
FLUID DISTRIBUTOR VALVE
Kay W. Hansen, 4907 River Road N., Salem, Oreg. 97303
Continuation-in-part of application Ser. No. 489,302, Sept. 22, 1965. This application June 17, 1966, Ser. No. 562,064
10 Claims. (Cl. 137—624.14)

This application is a continuation-in-part of my earlier application, Ser. No. 489,302, filed Sept. 22, 1965, now abandoned.

This invention relates to fluid control valves of the type which provide distribution of a fluid from a single source sequentially to a plurality of outlets.

It is the principal object of the present invention to provide a fluid distributor valve of the class described which is characterized by minimum axial height, minimum number of moving parts, simplicity of construction and assembly for economical manufacture, and long service life with a minimum of maintenance and repair.

The foregoing and other objects and advantages of this invention will appear from the following detailed description, taken in connection with the accompanying drawing in which.

Figure 3:
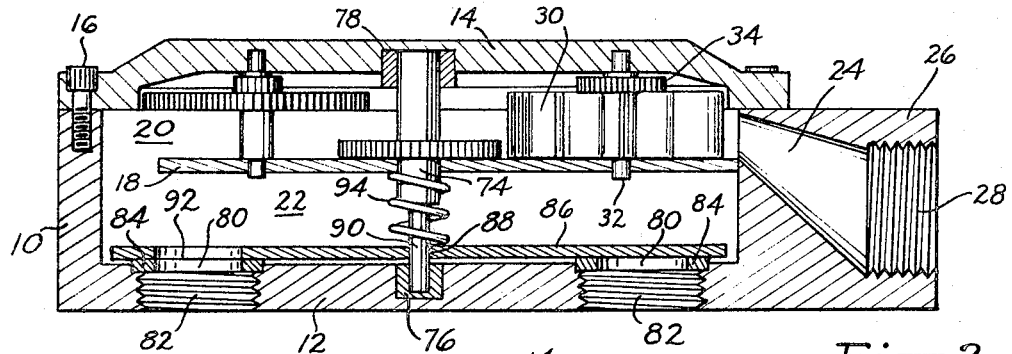
FIG. 3 is a sectional view taken on the line 3—3 in FIG. 2.
Figure 1:
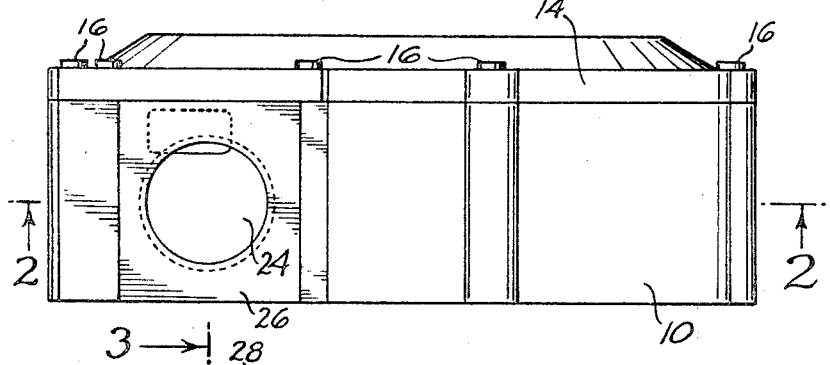
FIG. 1 is a view in side elevation of a fluid distributor valve embodying the features of the present invention.
Figure 2:
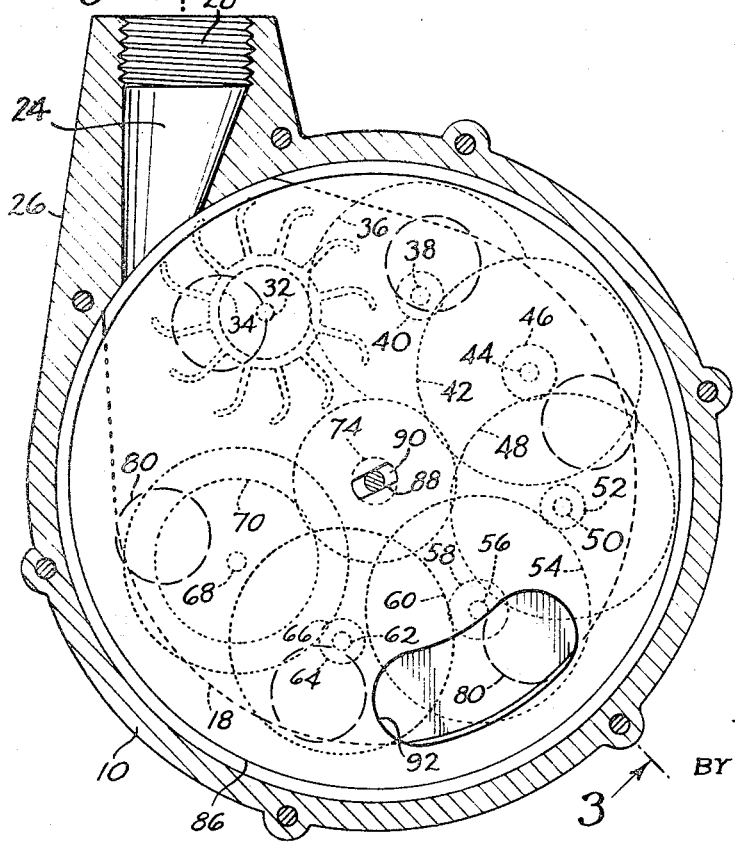
FIG. 2 is a sectional view taken on the line 2—2 in FIG. 1 and showing in broken lines the cooperative arrangement of the fluid driven impeller, the speed reducing gearing and the distributing valve member.
Figure 4:
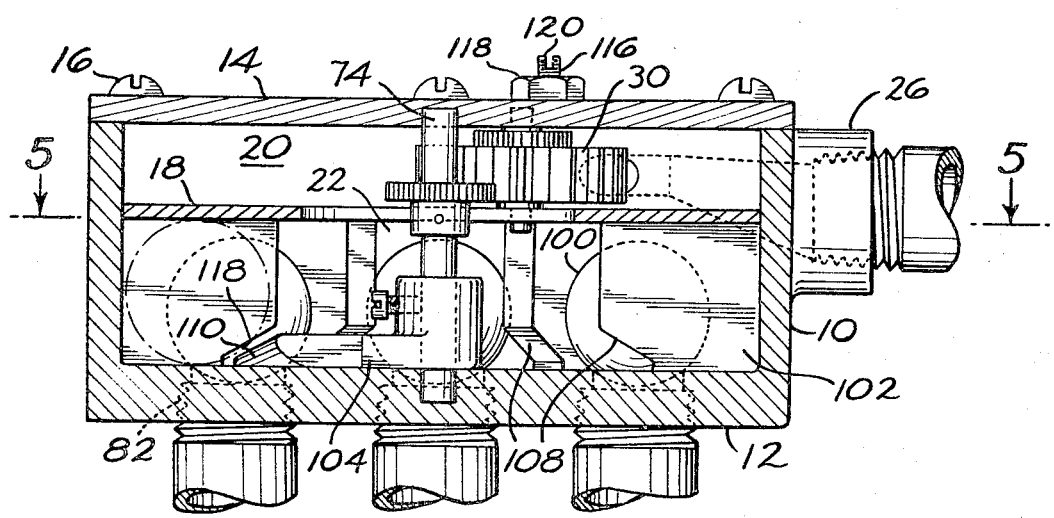
FIG. 4 is a sectional view similar to FIG. 3 but showing a second form of fluid distributor valve embodying the features of the present invention.

Referring first to FIGS. 1–3 of the drawings, the valve includes a hollow body which, in the preferred embodiment illustrated, is formed with a peripheral wall 10, an integral end wall 12, and a removable end wall 14. The removable end wall is secured to the peripheral wall by such means as the bolts 16. These walls define a chamber within the body.

A bearing plate member 18 is supported within the chamber, in a manner described more fully hereinafter, in spaced parallel relation to the end walls, and divides the chamber into an infeed compartment 20 and an outfeed compartment 22. The bearing plate member is smaller than the chamber, and therefore the infeed and outfeed compartments are in communication with each other for the passage of fluid therethrough.

A fluid inlet port 24 is provided in an outward projection 26 of the peripheral wall 10 of the body. The inner end of this port communicates with the infeed compartment 20, and its outer end is adapted for connection to a source of fluid under pressure, as by means of the threads 28. The inner end of the port preferably is constricted to increase the velocity of fluid as it enters the infeed compartment and impinges against the vanes of an impeller 30 supported in the infeed compartment for rotation about the axis of the pin 32. This pin is pressed into aligned openings in the removable wall 14 and bearing plate member 18.

Secured to the impeller 30 for rotation therewith is a gear 34 which connects the impeller to the input of a gear reduction unit also contained within the infeed compartment. The gear reduction unit comprises the following assembly of intermeshing gears:

The gear 34 meshes with the larger gear 36 mounted for rotation about the axis of the pin 38. The smaller gear 40, secured for rotation with the larger gear 36, meshes with the larger gear 42 mounted for rotation about the axis of the pin 44. The smaller gear 46, secured for rotation with the larger gear 42, meshes with the larger gear 48 mounted for rotation about the axis of the pin 50. The smaller gear 52, secured for rotation with the larger gear 48, meshes with the larger gear 54 mounted for rotation about the axis of the pin 56. The smaller gear 58, secured for rotation with the larger gear 54, meshes with the larger gear 60 mounted for rotation about the axis of the pin 62. The smaller gear 64, secured for rotation with the larger gear 60, meshes with the larger gear 66 mounted for rotation about the axis of the pin 68. The smaller gear 70, secured for rotation with the larger gear 66, meshes with the gear 72 secured for rotation with the drive shaft 74.

The pins which mount the intermeshing gears are pressed into aligned openings, in the removable wall 14 and bearing plate member 18, in manner similar to pin 32. It is by this means that the bearing plate member 18 is supported freely within the chamber of the body.

The drive shaft 74 extends freely through the bearing plate member 18 and is journaled for rotation in the bearings 76 and 78 mounted in the end walls 12 and 14, respectively.

The end wall 12 of the body is provided with a plurality of outlet ports 80, there being 6 such ports in the embodiment illustrated. These ports are spaced apart circumferentially about the axis of the drive shaft 74. The outer ends of these ports are adapted for connection to individual outlet fluid lines, as by means of the internal threads 82. The inner ends of these ports are provided with annular valve seats 84 which project slightly into the outfeed compartment 22 for sealing engagement with the rotary distributing valve member 86. This valve member is in the form of a flat circular disc provided with a central non-circular opening 88 receiving freely therethrough the correspondingly non-circular intermediate portion 90 of the drive shaft 74, for simultaneous rotation.

The valve member 86 is provided with an opening 92 disposed on the same radius as the outlet ports 80 for registry with the latter sequentially as the valve member is rotated. In the preferred embodiment illustrated, this opening has an arcuate length such that its end leading in the direction of rotation registers at least partially with a succeeding outlet port before its trailing end passes out of registry with the next preceding outlet port.

A coil spring 94 encircles the drive shaft and bears at its opposite ends against the bearing plate member 18 and valve member 86, whereby to urge the latter resiliently into sealing engagement with the annular valve seats 84, to provide a fluid tight seal therebetween.

In use, a source of fluid under pressure is connected to the inlet port 24 and a plurality of outlet conduits are connected one to each of the outlet ports 80. A typical installation for the distributor valve is a lawn sprinkling system wherein it is desired to control the sprinkling of six different zones on a predetermined sequence. Water under pressure impinges upon the impeller vanes, causing the impeller 30 to rotate. The gear reduction unit thus is operative to cause rotation of the drive shaft 74 and valve member 86.

In the position of the valve member illustrated in FIG. 2 the source of water pressure is directed entirely through one of the outlet ports 80, the remaining five outlet ports being closed. As rotation of the valve member continues, in the clockwise direction in FIG. 2, the valve opening 92 passes gradually from the opened outlet port and comes into gradual registry with the next succeeding outlet port. Thus, the water source is gradually diminished in the conduit connected to the preceding outlet port, and is gradually increased in the conduit connected to the next succeeding outlet port. This insures maximum water coverage in each zone radially outward from the sprinkler heads associated with each outlet conduit.

Referring now to the embodiment illustrated in FIGS. 4–8, this valve is similar to the valve previously described insofar as concerns the general arrangement of the hollow body, bearing plate member, inlet port, impeller and gear reduction unit. However, the flat valve member 86 of the previous embodiment is replaced by a plurality of balls 100, one of which is associated with each of the outlet ports 80. A plurality of circumferentially spaced webs 102 on the body extend radially inward from the wall 10, between the outlet ports. Each adjacent pair of webs functions to confine one of the balls loosely between them. Thus, each ball is disposed for releasable registration with an outlet port for opening and closing the latter.

Instead of the noncircular drive connection 88, 90 between the valve member 86 and drive shaft 74, by which the valve member 86 of the first embodiment described was actuated, the ball valves 100 are actuated by means of a cam member 104. This member is secured for rotation with the shaft 74, as by means of the set screw 106. The cam member projects radially from the shaft 74 sufficiently to engage the ball valves sequentially during rotation. For this purpose the inner bottom edges 108 of the webs are relieved to provide passage of the cam member.

Figure 5:
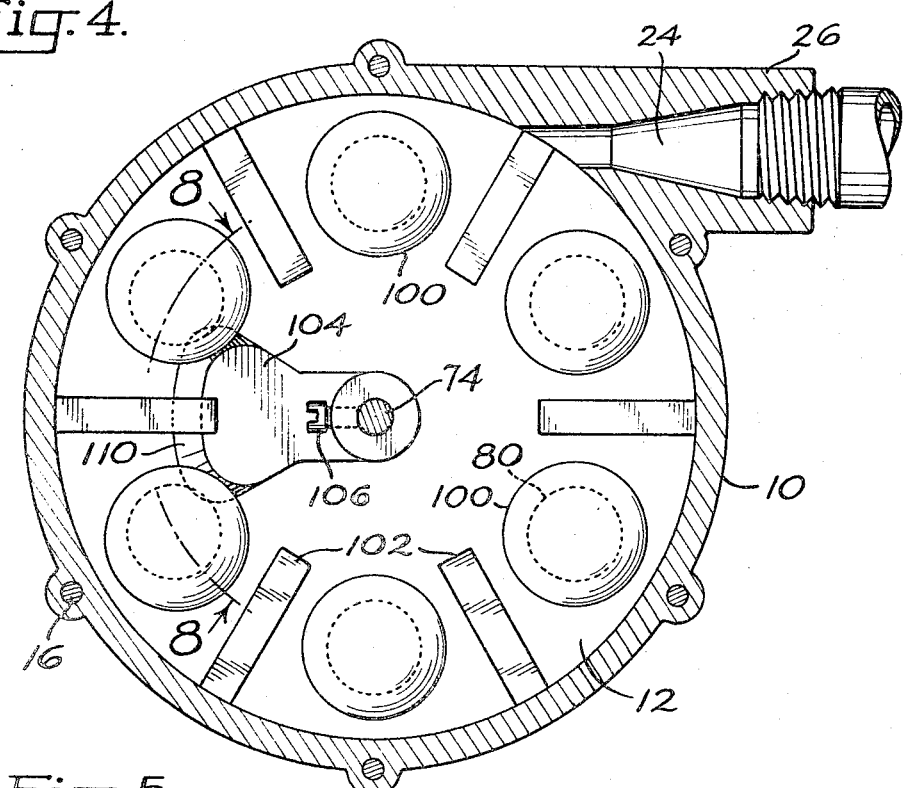
FIG. 5 is a sectional view taken on the line 5—5 in FIG. 4.
Figure 8:
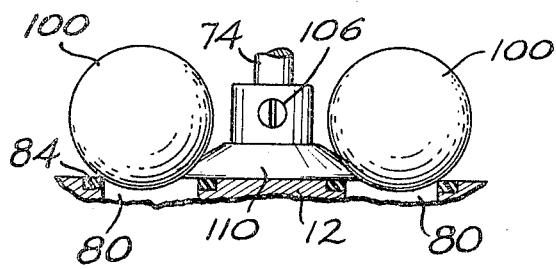
FIG. 8 is a fragmentary sectional view taken on the line 8—8 in FIG. 5.

In the preferred embodiment illusrtated, and as best seen in FIGS. 5 and 8, the projecting end of the cam member 104 is made sufficiently wide to engage a ball valve 100 and move it from sealing engagement with the associated outlet port 80, before it disengages from a preceding ball valve. It is by this arrangement that the distributor valve functions in the manner of the valve first described, wherein the elongated opening 92 functions to open an outlet port gradually as the next preceding port is gradually closed.

It is to be noted that the cam member has a tapered outer edge portion 110 and that this taper extends arcuately around the lateral ends of the cam member. As the trailing arcuate end portion moves away from a ball valve and the leading arcuate end portion moves into engagement with the next succeeding ball valve, the downward pressure exerted on the preceding ball valve by the water pressure, together with the weight of the ball, causes said ball valve to exert a significant force against the trailing arcuate end of the cam member to assist the latter in its rotation and thus to assist the cam member in unseating the next succeeding ball valve from its outlet port. Operation of the distributor valve thus is accomplished with a minimum of drive power.

As distinguished from the suspended arrangement of the bearing plate 18 in the first embodiment described, the bearing plate of this second embodiment rests upon the upper ends of the webs 102. It is provided with a central opening which affords communication between the chambers 20 and 22.

Although the gear reduction unit 112 of this second embodiment differs somewhat in number and size of interengaging gears, from the gear reduction unit previously described, it functions in the same manner to interconnect the impeller shaft 32 and the drive shaft 74.

Means may be provided for regulating the rotational speed of the drive shaft 74 and thus the time cycle of the distributor valve. In the embodiment illustrated, and best seen in FIGS. 6 and 7, such means are provided by a baffle plate 114 which is disposed between the inner end of the inlet port 24 and the vanes of the impeller 30. The baffle plate is secured to the lower end of the threaded shank 116 which extends freely through an opening in the end wall 14. The projecting outer portion of the shank receives a lock nut 118 by which to secure the baffle in any desired position of rotational adjustment. Such adjustment is facilitated by means of a screwdriver receivable in the slot 120 provided in the outer end of the shank.

Figure 6:
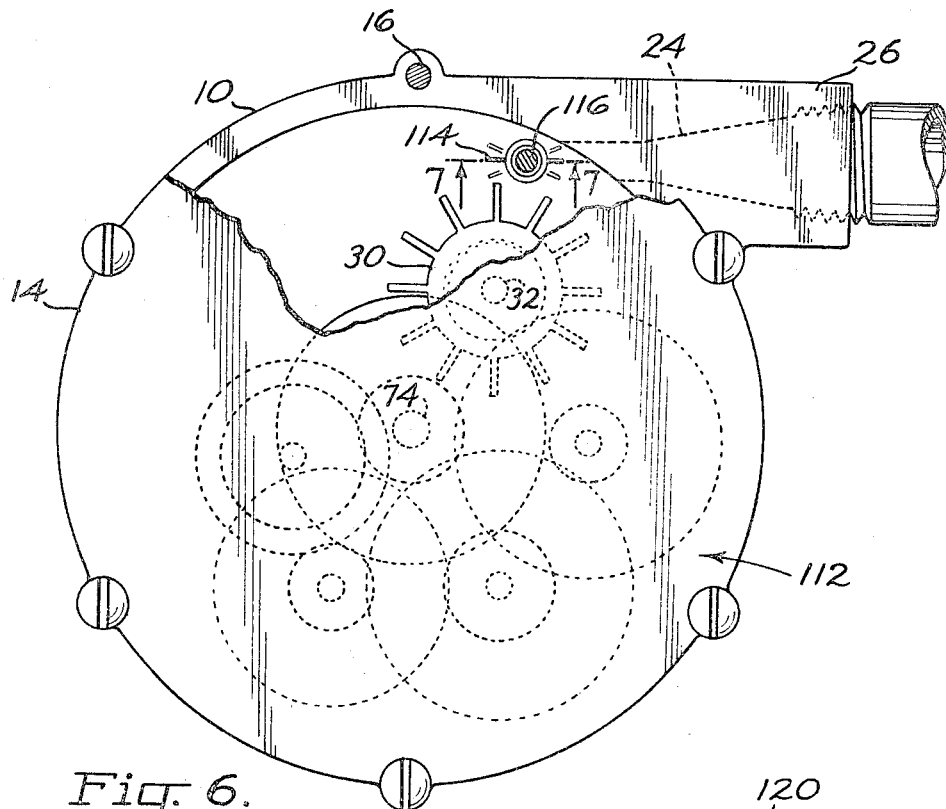
FIG. 6 is a plan view as viewed from the top in FIG. 4, a portion being broken away to disclose details of construction and the speed reducing gearing being illustrated in dotted lines.
Figure 7:
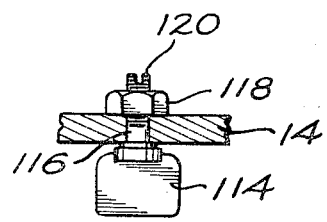
FIG. 7 is a fragmentary sectional view taken on the line 7—7 in FIG. 6.

Thus, referring to FIG. 6, rotation of the shank counter-clockwise from the full line position illustrated, serves to direct substantially the full flow of water under pressure from the inlet port 24 onto the impeller vanes. Conversely, by rotating the shank clockwise from the full line position illustrated, the baffle is disposed in a position which effectively diverts substantially all of the water flow from the inlet port away from the impeller vanes. Positions of adjustment intermediate these extremes provide effective control of the degree of water impingement on the impeller vanes, with corresponding variation in rotational speed of the drive shaft 74.

It will be apparent that the distributor valve described hereinbefore may be utilized for a variety of distributing systems. For example, it may be utilized with ornamental fountains to provide a variety of artistic patterns.

The compactness of construction achieved by the present invention is apparent from the drawings which illustrates a six outlet distributor valve in full scale. This compactness of construction is derived primarily by the alternate overlapping of adjacent gears in the reduction unit disposed about the axis of the drive shaft, and the coaxial arrangement of the valve member and outlet ports. The number of outlet ports may be varied over a wide range, by varying the diameter of the body but without changing the axial height of the body.

Although the valve components may be made of various materials, it is preferred that the body, drive shaft, pins, valve member and bearing plate be constructed of metal, such as brass or other corrosion resistant metal, and that the gears, impeller and valve seats be made of nylon, Teflon, or other suitable synthetic plastic material.

It will be apparent to those skilled in the art that various changes may be made in the number, size and arrangement of parts and other structural details described hereinbefore without departing from the spirit of this invention and the scope of the appended claims.

Having now described my invention and the manner in which it may be used, what I claim as new and desire to secure by Letters Patent is:

1. A fluid distributor valve, comprising:
 (a) a hollow body having a peripheral wall and end walls defining a chamber therebetween,
 (b) a bearing plate member in the chamber between the end walls of the body dividing the chamber into an infeed compartment and an outfeed compartment, said compartments communicating with each other for the passage of fluid,
 (c) a rotary drive shaft extending through the bearing plate member,
 (d) a plurality of outlet ports in the end wall of the body defining the outfeed compartment spaced circumferentially about the axis of the drive shaft,
 (e) valve means in the outfeed compartment registering with the outlet ports for opening and closing the latter,
 (f) valve actuator means engaging the drive shaft and arranged upon rotation of the latter to actuate the valve means to open and close the outlet ports sequentially, (g) an inlet port in the body for admitting fluid under pressure into the infeed compartment, (h) an impeller member mounted for rotation in the infeed compartment and having impeller vanes disposed adjacent the inlet port for impingement of infeed fluid thereagainst, and (i) a plurality of interengaging reduction gears mounted for rotation in the infeed compartment on said bearing plate member, the first of said gears engaging the impeller member and the last of said gears engaging the drive shaft.

2. The distributor valve of claim 1 wherein the reduction gears and impeller member are arranged in the infeed compartment concentrically about the axis of the drive shaft.

3. The distributor valve of claim 1 including baffle means between the inlet port and impeller member mounted on the body for adjustment relative to the impeller member for regulating the flow of fluid under pressure to the impeller member.

4. The distributor valve of claim 1 where the valve means comprises a plurality of balls, one registering with each outlet port, the body having a plurality of circumferentially spaced webs adjacent pairs of which loosely confine one of the balls, and the valve actuator means comprises a cam member secured to the drive shaft and arranged during rotation of the latter to engage and move each ball from sealing engagement with its associated outlet port.

5. The distributor valve of claim 4 wherein the cam member is proportioned to engage and move one ball from sealing engagement with its associated outlet port before it disengages from and returns a preceding ball to sealing engagement with its associated outlet port.

6. The distributor valve of claim 1 wherein the valve means comprises a flat valve member in the outfeed compartment overlying the outlet ports in sealing relation and secured to the drive shaft for rotation therewith, the valve member having an opening therethrough arranged to register selectively with the outlet ports, and the valve actuator means comprises connector means on the valve member engaging the drive shaft for rotation therewith.

7. The distributor valve of claim 6 wherein the opening in the valve member is proportioned to register with one of the outlet ports before passing from the next preceding port during rotation of the valve member.

8. The distributor valve of claim 7 including annular valve seat means surrounding each outlet port and projecting into the outfeed compartment for sliding engagement by the valve member.

9. The distributor valve of claim 6 including resilient means between the bearing plate member and valve member urging the latter toward the outlet ports.

10. The distributor valve of claim 9 wherein the resilient means comprises a coil spring surrounding the drive shaft.

References Cited

UNITED STATES PATENTS 3,108,609   10/1963   Schroder _____ 137—624.14 X

ALAN COHAN, *Primary Examiner.*